United States Patent [19]

Yamamoto et al.

[11] Patent Number: 4,537,808
[45] Date of Patent: Aug. 27, 1985

[54] ELECTRICALLY CONDUCTIVE COMPOSITE MATERIAL

[75] Inventors: Susumu Yamamoto; Kazuyoshi Sato, both of Hyogo, Japan

[73] Assignee: Sumitomo Electric Industries, Ltd., Osaka, Japan

[21] Appl. No.: 602,984

[22] Filed: Apr. 23, 1984

[30] Foreign Application Priority Data

May 7, 1983 [JP] Japan .................................. 58-79730

[51] Int. Cl.³ ........................ B32B 15/08; F16F 3/00; H01C 3/10
[52] U.S. Cl. ..................................... 428/36; 428/457; 428/699; 267/86; 338/294
[58] Field of Search ..................... 428/457, 699, 36

[56] References Cited

U.S. PATENT DOCUMENTS 4,353,951 10/1982 Yukitoshi et al. ............. 428/457 X Primary Examiner—Patricia C. Ives
Attorney, Agent, or Firm—Sughrue, Mion, Zinn, Macpeak and Seas

[57] ABSTRACT

An electrically conductive composite material having a copper core and an iron- or nickel-base alloy clad material, with the cross sectional ratio of the clad material to core satisfying the relation $0.1 < Se/(Se+Scu) \leq 0.8$ and the tensile strength P (in kg/mm²) satisfies the relation $230 - 1.9 \times (100Scu + 2.3Se)/Se + Scu) \geq P \geq 80 - 0.4 \times (100Scu + 2.3Se)/Se + Scu)$, where Se represents the cross-sectional area of the clad material and Scu represents the cross-sectional area of the copper core. The clad material may be made of iron, steel, alloyed steel, stainless steel, or a steel inner layer and a stainless steel outer layer.

6 Claims, 7 Drawing Figures

ELECTRICALLY CONDUCTIVE COMPOSITE MATERIAL

BACKGROUND OF THE INVENTION

This invention relates to a supporting member or spring material that requires good electrical conductivity and high mechanical strength. Conventional structural members are usually made of high strength iron or steel material and in applications that require corrosion resistance, stainless steels are generally used. Those components of electrical machines which require good electrical conductivity are made of copper-based materials. Phosphor bronze is selected for certain spring materials that require high electrical conductivity and beryllium-copper and titanium-copper alloys are used if a higher mechanical strength is required. However, the mechanical strength of phosphor bronze is low whereas beryllium-copper and titanium-copper alloys are very expensive and have low rigidity. Therefore, these copper alloys do not provide springs that perform as well as those made of steel-based materials. The tensile strength vs conductivity profile of six conventional copper alloys is shown in FIG. 1. As shown in FIG. 1 (A) is Cu-Ni, (B) is Cu-Ti, (C) is Be-Cu, (D) is Cu-Fe, (E) is Cu-Cd and (F) is pure copper.

The primary object of the present invention is to provide a material having both good electrical conductivity and high mechanical strength, identified by region G in FIG. 1. In this region superior results are attained.

Another object of the invention is to provide an inexpensive spring material and a highly conductive supporting member.

These and other objects of this invention are accomplished by an electrically conductive composite material having a copper core and an iron-or nickel-base alloy clad material. The cross-sectional ratio of the clad material to the core is $0.1 \leq Se/Se + Scu \leq 0.8$ where Se is the cross-sectional area of the clad material and Scu is the cross-sectional area of the copper core. Additionally, the tensile strength P in kg/mm$^2$ is: $230 - 1.9(100Scu + 2.3Se)/(Se + Scu) \geq P \geq 80 - 0.4(100Scu + 2.3Se)/(Se + Scu)$. The clad material may be iron, steel, alloyed steel, stainless steel or a steel inner layer and a stainless steel outer layer. This invention will be defined in greater detail by reference to the drawings and the description of the preferred embodiment that follows.

DESCRIPTION OF THE PREFERRED EMBODIMENT

Figure 1:
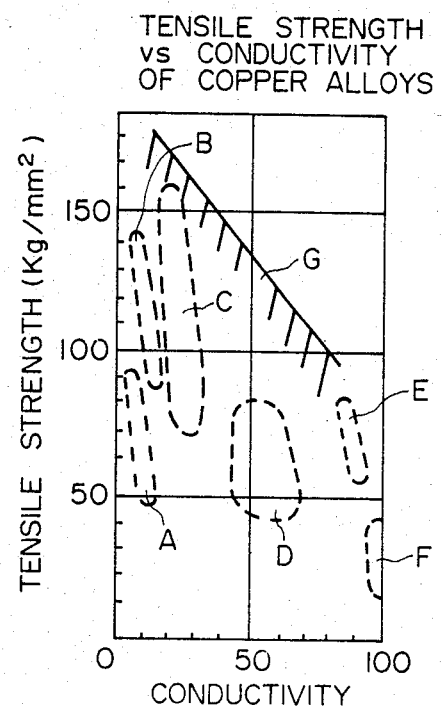
FIG. 1 is a diagram showing the tensile strength vs electrical conductivity profile of various copper alloys in order to explain the present invention.
Figure 2:
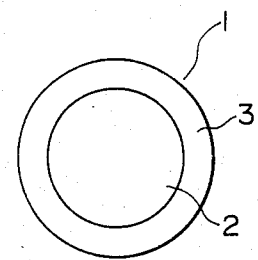
FIG. 2 is a cross-section diagram illustrating the construction of the composite material of the present invention.

The composite material of the present invention is generally indicated at 1 in FIG. 2 and comprises a copper core 2 and a high-strength iron- or nickel-based alloy clad material 3. The clad material is formed of an iron- or nickel-based alloy in order to provide sufficient strength to withstand the torsion stress or pressure that is imposed on spring materials and supporting members. A stainless steel clad material has not only high mechanical strength but also good corrosion resistance.

It has been found that the structure shown in FIG. 2 has industrial utility only when the cross-sectional ratio of the clad material to core satisfies the relation $0.1 \leq Se/(Se + Scu) \leq 0.8$ wherein Scu represents the cross-sectional areas of the copper core and Se represents the cross-sectional area of the clad material. If the cross-sectional ratio of the clad material to core is less than 0.1, the necessary rigidity for use as a spring is not obtained. If the cross-sectional ratio is greater than 0.8, no corresponding increase in the rigidity is achieved and the electrical conductivity is less than 20% IACS, which is insufficient for the purposes of the present invention.

The structure of FIG. 2 preferably has a tensile strength P in kg/mm$^2$ that is smaller than $230 - 1.9 \times (100Scu + 2.3Se)/(Se + Scu)$ and greater than $80 - 0.4 \times (100Scu + 2.3Se)/(Se + Scu)$. A composite material having a tensile strength P greater than the defined upper limit cannot be subjected to cold working or heat treatment without becoming brittle. Conversely, a structure whose tensile strength P is less than the lower limit has no advantage over copper alloys.

The composite material of the present invention can be fabricated by any of the following methods: (1) a copper wire is inserted into a steel pipe, (2) a sheet of a steelbase material is wound around a copper wire and the opposing sides of the sheet are welded to each other, or (3) molten copper is poured into a steel pipe. In order to attain the necessary cross-sectional ratio of clad material to core and the desired tensile strength, the composite structure is subjected to repeated rolling or drawing and heat treatment, followed by final cold working, quenching or aging. Improved adhesion between the core and clad material may be attained by exposing the structure at least once to a temperature higher than 800° C. The objects of the present invention can also be achieved by using a two-layered or multi-layered clad material made of steel and stainless steel or iron and nickel based alloy.

The advantages of the present invention are described by reference to the following examples.

EXAMPLES

Two composite materials according to the present invention as well as two comparative samples were prepared. Their compositions and constructions are shown in Table 1.

TABLE 1

| Sample | | Chemical Composition of Test Samples | | | | | | | |
|---|---|---|---|---|---|---|---|---|---|
| | | C | Si | Mn | P | Cu | Ni | Cr | Sn |
| FeCL | Steel Sheet | 0.23 | 0.23 | 0.58 | 0.022 | — | — | — | — |
| | pure cu | — | — | — | — | >99.9 | — | — | — |

TABLE 1-continued

| | | Chemical Composition of Test Samples | | | | | | | |
|---|---|---|---|---|---|---|---|---|---|
| Sample | | C | Si | Mn | P | Cu | Ni | Cr | Sn |
| 304CL | 304 pipe | 0.041 | 0.47 | 1.02 | 0.032 | — | 8.76 | 18.16 | — |
| | pure Cu | — | — | — | — | >99.9 | — | — | — |
| PB | phosphor bronze | — | — | — | 0.20 | 93.2 | — | — | 6.58 |
| 304 | AISI 304 | 0.070 | 0.72 | 1.37 | 0.032 | — | 8.41 | 18.51 | — |

FeCL was fabricated by the following procedure: a steel sheet was wrapped around a copper wire and the opposing sides of the sheet were welded in the longitudinal direction; the resulting structure was drawn through the roller die by one pass and subjected to repeated annealing and die drawing until the final diameter of 2.0 mm was obtained. The steel clad material of the final product had a cross-sectional ratio of 20%.

304CL was prepared by the following procedure: a copper wire inserted in a 304 stainless steel pipe was drawn through a die and subjected to repeated solution treatment and drawing until the cross-section ratio of the steel clad material was 54%. The interdiffusion layer of 304 clad material and copper core had a thickness of about $5\mu$.

PB as one comparative sample was made of a phosphor bronze wire, and 304 as another comparative sample was a wire equivalent to AISI 304 for springs.

The four samples had the following characteristics.

MECHANICAL PROPERTIES AT ROOM TEMPERATURE

FeCL, 304CL, PB and 304 were annealed at 300° C. for 20 minutes, 200° C. for 20 minutes, 250° C. for 60 minutes and 380° C. for 20 minutes, respectively. The tensile strength P, elongation, reduction of area, Young's modulus and rigidity of the low temperature annealed samples are shown in Table 2 together with values for the untreated samples.

TABLE 2

| | | Tensile and Torsion Properties of Test Samples | | | | |
|---|---|---|---|---|---|---|
| Sample | Low Temp. Annealing | Tensile Strength (kg/mm$^2$) | reduction of area (%) | Elongation (%) | Young's Modulus (kg/mm$^2$) | Rigidity (kg/mm$^2$) |
| FeCL | not treated | 62 | 50 | 3.5 | 12000 | 5700 |
| | treated | 45 | 41 | 2.0 | 12400 | 5900 |
| 304CL | not treated | 118 | 43 | 2.5 | 15000 | 6600 |
| | treated | 126 | 19 | 1.4 | 15100 | 6800 |
| PB | not treated | 98 | 63 | 1.5 | 10400 | 4500 |
| | treated | 86 | 68 | 2.4 | 10700 | 4600 |
| 304 | not treated | 180 | 53 | 1.1 | 17000 | 7100 |
| | treated | 199 | 47 | 0.5 | 17500 | 7400 |

Because of the higher cross-sectional ratio of SUS 304 steel clad material, 304CL had a higher tensile strength and Young's modulus than FeCL. The rigidity of 304CL was half as much again as the value of PB and was closer to the rigidity of 304 than any other sample. In spite of the lower cross-sectional ratio of SUS 304 steel clad material, FeCL had a satisfactory rigidity and would perform well as a spring material.

SPRING FATIGUE PROPERTIES

Springs having the specifications shown in Table 3 were made from 304CL, 304 and PB.

TABLE 3

| Wire diameter: | 2.0 mm |
|---|---|
| Average coil diameter | 18.5 mm |
| Effective number of turns: | 4.5 |
| Total number of turns: | 6.5 |
| Free length: | 47.0 mm |
| Winding direction: | clockwise |

Figure 3:
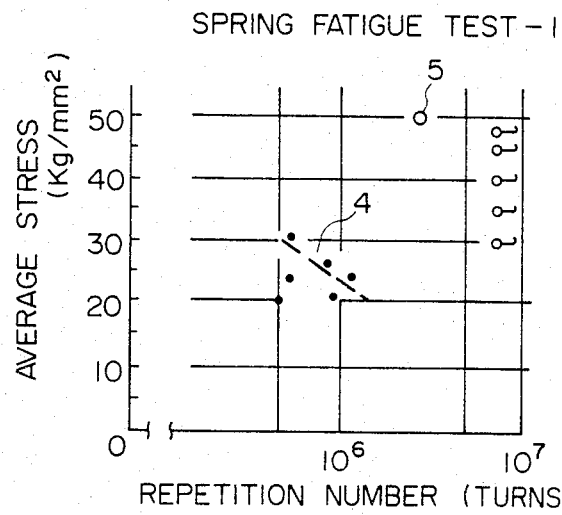
FIGS. 3 to 5 are graphs of the results of three fatigue tests conducted with springs made of the composite material of the present invention.
Figure 4:
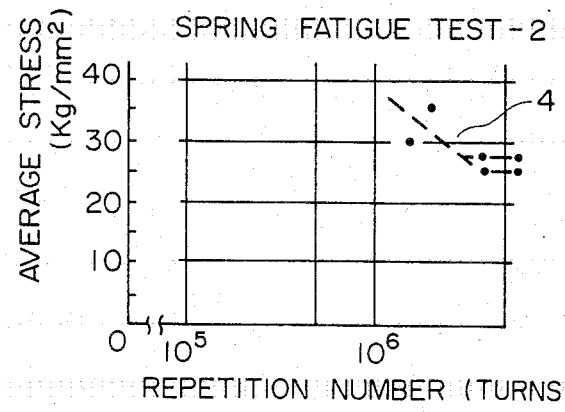
Figure 5:
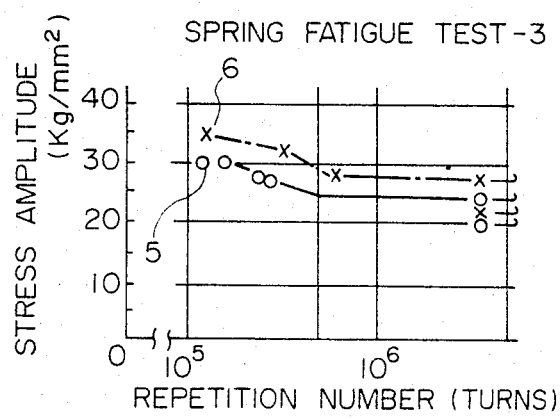

The three kinds of springs were subjected to a fatigue test. The setting stress was 70 kg/mm$^2$ for those made from 304 CL and 304, and 50 kg/mm$^2$ for the one made from PB. The test results are shown in FIG. 3 (stress amplitude: 20 kg/mm$^2$) and in FIG. 4 (stress amplitude: 13.5 kg/mm$^2$). The fatigue limit for the 340CL spring (indicated at 5 in FIG. 3) was 48 kg/mm$^2$ in terms of average stress. Stress values greater than 50 kg/mm$^2$ could not be tested because the initial stress setting was exceeded. When the average stress for the PB spring (indicated at point 4 in FIG. 3) was less than 20 kg/mm$^2$, the minimum stress became negative and the sample was no longer usable in the fatigue test. In order to determine the fatigue limit for the PB spring, the stress amplitude was reduced to 13.5 kg/mm$^2$. As shown in FIG. 4, the PB spring had a fatigue limit of 28 kg/mm$^2$ in terms of average stress. However, the 304CL spring did not fail throughout the range tested. The S-N curves of 304CL and SUS 304-WPB for an average stress of 40 kg/mm$^2$ are shown in FIG. 5, from which it can be seen that there was no significant difference between the two samples.

FAILURE PROPERTIES (i) At room temperature

Figure 6:
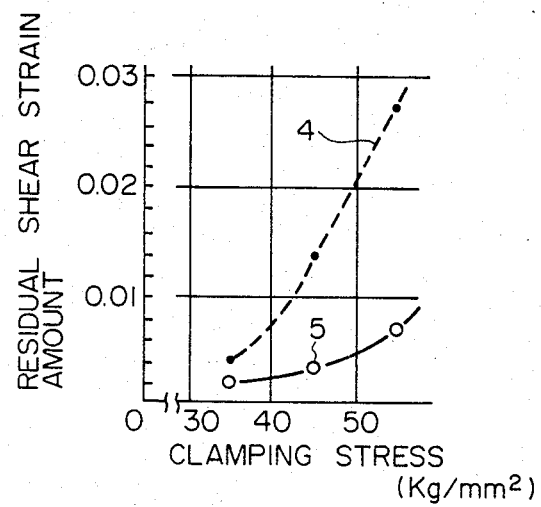
FIGS. 6 and 7 are graphs showing the failure resistance of springs made from one example of the composite material of the present invention.

304CL and PB springs each having the specification shown in Table 3 were subjected to a clamping test at room temperature for 20 hours. The profile of the clamping stress vs failure amount (residual shear strain) for each sample is shown in FIG. 6, from which it can be seen that the 304CL had a very small residual shear strain.

(ii) At elevated temperatures

Figure 7:
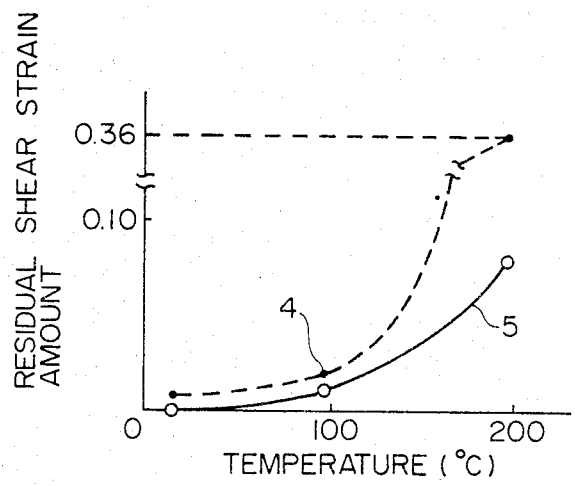

304CL and PB springs having the specifications shown in Table 3 were subjected to a failure test by clamping the samples at the stress of 35 Kg/mm$^2$ for 20 hours at varying temperatures. The results are shown in FIG. 7, from which it can be seen that the 304CL was stronger than PB and that the difference in their strength was amplified as the temperature increased.

ELECTRICAL CONDUCTIVITY

The electrical conductivities of FeCL, 304CL, PB and 304 are shown in Table 4. The values for the two samples of the present invention (FeCL and 304CL) were almost equal to the averages of the clad material and core materials. The conductivities of FeCL and 304CL were measured with a galvanometer whose terminals were connected to the 304 or steel clad material. It is assumed that because of the small thickness of each clad material ($\leq 0.32$ mm), the overall conductivity was almost equal to the average of the components of each sample. Of course, 304CL and FeCL would have lower conductivities if they are shorter and have a thicker clad material. However, this is a rare case because the ratio of the clad material thickness to the entire length of 304CL and FeCL used as wire is in most cases less than 1/100.

TABLE 4

| Electrical Conductivity of Test Samples | |
|---|---|
| Sample | Conductivity (% IACS) |
| FeCL | 81.02 |
| 304CL | 46.64 |
| PB | 12.24 |
| 304 | 2.23 |

Corrosion resistance

A stainless clad material may be used in applications which require high corrosion resistance. The results of a brine spray test and an $H_2SO_3$ fume test conducted with 304CL, PB and 304 are shown in Table 5. The 304CL was not so corrosion-resistant as 304 (contact corrosion would be caused) but was much more resistant than PB.

TABLE 5

| Corrosion resistance of polished spring cross-section | | | | |
|---|---|---|---|---|
| | Brine spray test | | $H_2SO_3$ fume test | |
| Sample | corrosion starting day | percentage of corroded area after 25 days | corosion starting day | percentage of corroded area after 25 days |
| 304CL 304 | 4th day | 5–60% | 16th day | 40–70% |
| Cu | 1st day | 10–30% | 12th day | 20–80% |
| PB | 1st day | 20% | 8th day | 90% |
| 304 | not corroded | 0 | 16th day | 20% |

While the composite material of the present invention is described above by reference to its use as a spring material, it should be understood that the advantages of this composite material are also obtained if it is used as a structural supporting member. Modifications of this invention may be practiced without departing from the scope of the invention.

We claim:

1. An electrically conductive composite comprising:
   a copper or copper alloy core;
   an iron- or nickel-base alloy clad material surrounding the core;
   the cross-sectional ratio of the clad material to core is within the range of: $0.1 \leq Se/(Se+Scu) \leq 0.8$ where:
   Se is the cross-sectional area of the clad material,
   Scu is the cross-sectional area of the copper-core and,
   the tensile strength P in kg/mm is within the range of: $230-1.9(100Scu+2.3Se)/(Se+Scu) \leq P \leq 80-0.4(100Scu+2.3Se)/(Se+Scu)$.

2. The composite of claim 1 wherein the clad material is made of iron.

3. The composite of claim 1 wherein the clad material is made of steel.

4. The composite of claim 1 wherein the clad material is made of alloyed steel.

5. The composite of claim 1 wherein the clad material is made of stainless steel.

6. The composite of claim 1 wherein the clad material comprises a steel inner layer and a stainless steel outer layer.

* * * * *